Feb. 3, 1970  C. G. AHRENS  3,493,134
BALE HANDLING APPARATUS
Filed July 15, 1968  2 Sheets-Sheet 2

INVENTOR.
COLIN G. AHRENS
BY Rogers, Bereskin, & Parr

United States Patent Office 3,493,134
Patented Feb. 3, 1970

3,493,134
BALE HANDLING APPARATUS
Colin G. Ahrens, P.O. Box 543, Rosetown,
Saskatchewan, Canada
Filed July 15, 1968, Ser. No. 744,955
Int. Cl. B66c 1/62; B66f 9/18; B65a 57/16
U.S. Cl. 214—147                    5 Claims

ABSTRACT OF THE DISCLOSURE

A frame structure adapted for use on a farm tractor to handle a plurality of bales which have been stacked in a triangular pile. The frame consisting of a horizontal load support with a plurality of pivoted finger-like elements pivotally connected thereto and movable relative to the support to retain a load on said support. A rotating mechanism is provided to rotate the support, along with its coacting fingers, in a vertical plane.

---

This invention relates to apparatus for handling material such as bales of hay, and in particular to a bale handling attachment for use with self-propelled vehicles such as tractors having front end load elevators.

It is common practice to form hay and straw in the field into generally rectangular bales which are held together by wire, and numerous mechanical devices have been developed for producing bales with a minimum of manual labour. After the bales are made, they are generally ejected onto the ground, from whence they must later be gathered together, transported to a storage area, properly positioned in the storage area, and subsequently removed from the storage area to a feeding area. Considerable labour is involved in these numerous operations. In the past, it has been usual to permit each bale to remain on the ground exposed to the elements until the hay has cured or the farmer is ready to collect the hay and transport it to the storage area. It is well known that when hay is left in the field it is subject to spoilage through moisture and dampness. In order to reduce such spoilage many farmers have adopted the practice of arranging the bales in triangular stacks of between about six to fifteen bales. Such stacks tend to shed water more easily and thus offer a measure of protection against water spoilage. The present invention is particularly designed to handle bales which have been arranged in triangular stacks, and is capable of manipulating the triangular stacks as required. In order to minimize expense to the farmer, the apparatus has been specifically designed as an attachment for a tractor having a load elevator or front end loader.

Objects of the invention are therefore to provide an apparatus for attachment to a tractor having a load elevator which attachment is capable of handling triangular stacks of bales of hay or straw, and which is relatively simple to operate, efficient and reliable.

Figure 5:
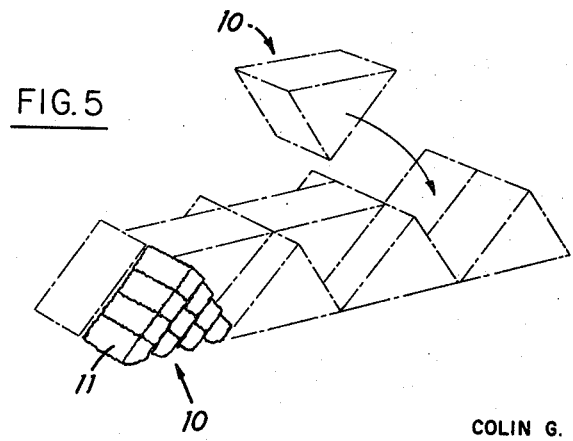
FIG. 5 is a diagrammatic view showing a preferred arrangement for storing triangular stacks in a storage area.

A typical triangular stack 10 of bales 11 is shown in FIG. 5. Prior to being handled by the apparatus of the present invention, the bales are manually arranged in the field to form triangular stacks containing any desired number of bales. Ten bales are shown in the stacks shown in FIG. 5 and this constitutes an average number. The apparatus of FIG. 1 is particularly designed for handling triangular stacks of bales as shown.

Figure 1:
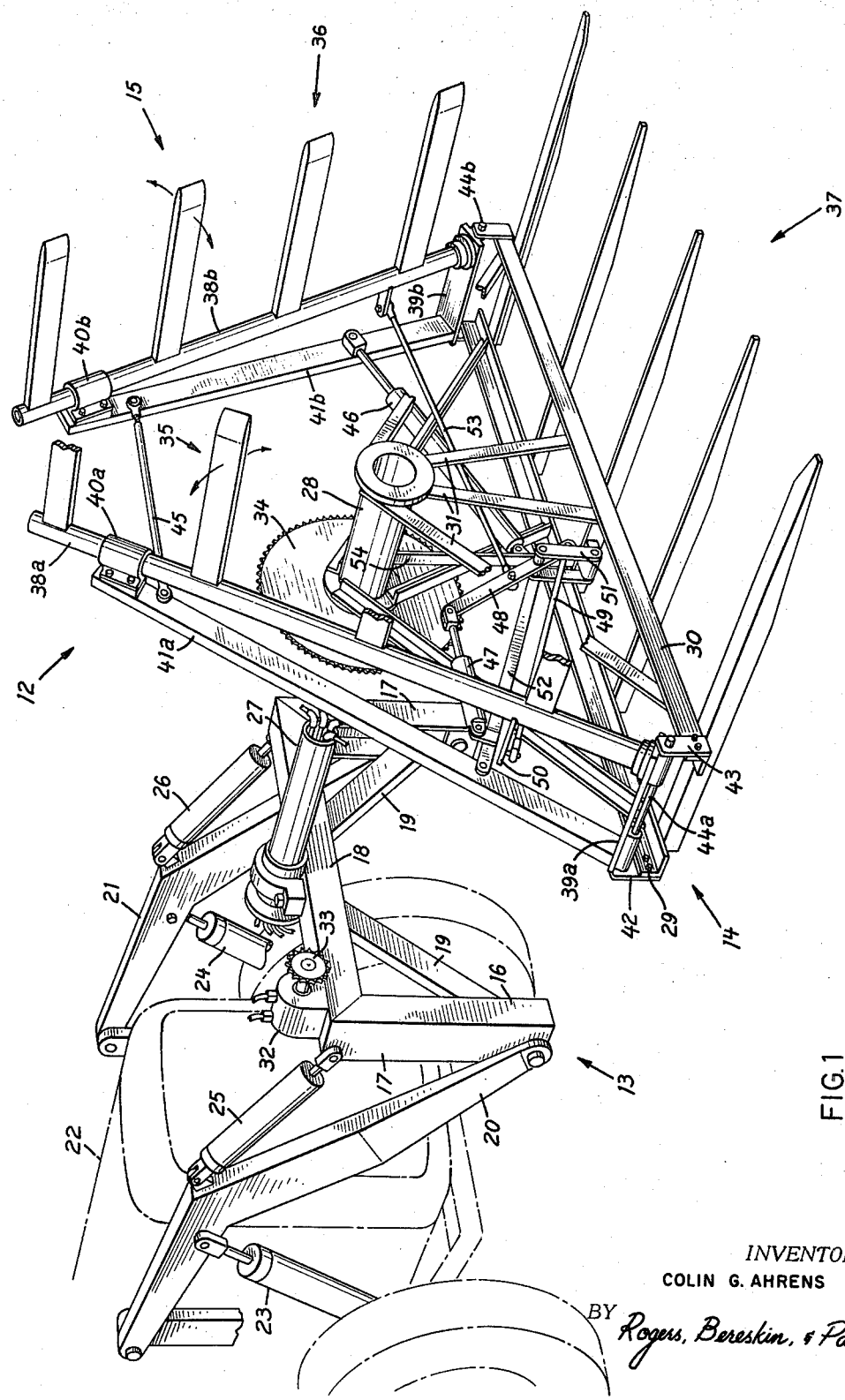
FIG. 1 is a perspective view, partly exploded, showing a preferred embodiment of an improved bale handling apparatus according to the invention.

Referring now to FIG. 1, a preferred form of bale handling apparatus is generally indicated by reference numeral 12 and it includes the following main components: a primary frame 13, a rotatable secondary frame 14 and a clamp assembly 15. These components will now be described in detail.

PRIMARY FRAME

The primary frame 13 consists of an inverted U-shaped member 16 of heavy angle stock and which has two spaced vertical legs 17 and a horizontal leg 18 extending between the legs 17. A heavy-walled sleeve 27 is rigidly attached near its inner end to the upper surface of the leg 18, and it supports the secondary frame 14. The U-shaped member 16 is reinforced by struts 19, and is pivotally supported between arms 20 and 21 of a conventional load elevator fitted to a tractor 22 or other self-propelled vehicle. The arms 20 and 21 are movable from a position wherein their lower ends are near the surface of the ground to an elevated position by means of a pair of hydraulic cylinders 23 and 24. Load elevators of the kind described above are in common use on farms, and the bale handling apparatus 12 is designed to be quickly attached to and removed from tractors equipped with such load elevators.

It is desirable to control the pitch of the primary frame 13 independently of the position of the load elevator arms 20 and 21. This is accomplished by means of a pair of hydraulic cylinders 25 and 26 which respectively are attached to the uper ends of the arms 17 of the primary frame 13. The opposite ends of the hydraulic cylinders 25 and 26 are respectively secured to the load elevator arms 20 and 21. Accordingly, by suitably adjusting the hydraulic cylinders 25 and 26, the primary frame 13 can be kept in a generally vertical plane during raising and lowering of the load elevator arms 20 and 21, or given any desired inclination.

SECONDARY FRAME

The secondary frame 14 is capable of being rotated about a longitudinal axis coaxial with the axis of the sleeve 27 upon which the secondary frame 14 is supported. Support for the secondary frame 14 is provided by a heavy-walled sleeve 28 which surrounds the sleeve 27 when the bale handling attachment 12 is in place. The secondary frame 14 also includes a pair of spaced-apart transversely positioned angle members 29 and 30, and the sleeve 28 is supported by means of radial struts 31 which extend downwardly from opposite ends of the sleeve 28. The struts 31 are arranged in two sets, with one set for each of the ends of the sleeve 28. The lower ends of the rear set of struts 31 are fastened to the angle member 29, and the lower ends of the struts 31 of the forward set are fastened to the angle member 30.

The secondary frame 14 can be rotated by means of a hydraulic motor 32 which is secured to the leg 18 of the primary frame 13. The motor 32 is provided with a sprocket 33 that is coupled to a large diameter sprocket 34 by means of an endless chain (not shown). The sprocket 34 is fixed to the inner end of the sleeve 28. Various hydraulic hoses (with swivels) for operating hydraulic cylinders on the clamp assembly are fed through the sleeve 27 for connection with the hydraulic system of the vehicle 22.

CLAMP ASSEMBLY

The clamp assembly 15 provides a triangular enclosure for receiving a triangular stack of bales and its function is to grasp a triangular stack of bales and to hold the stack securely during subsequent operations such as raising, lowering or inverting the stack. Examination of FIG. 5, indicates that in order to conform the shape of the triangular enclosure formed by the clamp assembly 15 to the shape of the triangular stack, it is necessary to alter the apex angle of the clamp assembly 15 depending upon which side of the stack is approached. The reason for this that the sides of the stacks are of unequal lengths. The mechanism for performing these functions is as follows.

A triangular enclosure for receiving triangular stacks is provided by first, second and third sets of spaced-apart finger members 35, 36 and 37 respectively. The first set of finger members 35 is secured to a tubular arm member 38a which is pivotally supported at its base by a flat base plate 39a and at its upper end by a collar 40a which is secured to a brace member 41a. The foot of the brace member 41a is fixed to the plate 39a, which is pivotally supported between the angle members 29 and 30 by means of brackets 42a, 43a and a pin 44a. Thus, both the arm member 38a and the brace member 41a are pivotable about the axis of the pin 44, and in addition the arm member 38a is pivotable about its own longitudinal axis. The finger members 35, 36 and 37 are preferably formed of flat stock and are provided with tapered outer ends to facilitate removal of stacks from a large pile of stacks as shown in FIG. 5.

The second set of finger members 36 is secured to an arm member 38b identical to the arm member 38a and the remainder of the parts associated with the second set of finger members 36 and identical to the parts described above (corresponding parts are denoted by the letter "b"—e.g. 39b, 40b, etc.). The third side of the triangular enclosure formed by the clamp assembly 15 is provided by the third set of finger members 37, which are fixed to the underside of the angle members 29 and 30 as shown. It is not necessary to provide any adjustment or clamping action for the fingers 37.

Figure 2:
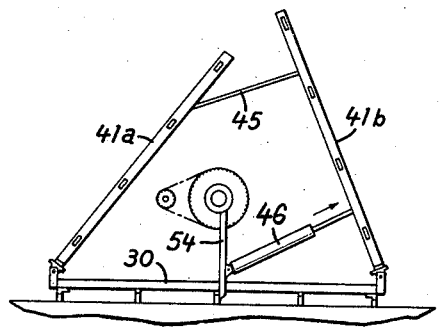
FIGS. 2 and 3 are diagammatic views showing the manner in which a clamp assembly of the apparatus of FIG. 1 can be made to conform to the shape of any selected triangular stack of bales.
Figure 3:
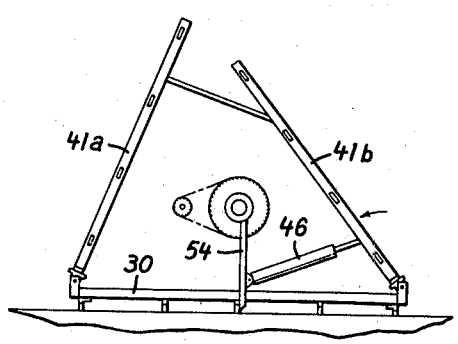

In order to ensure that the relative positions of the first and second sets of finger members 35 and 36 are independent of changes in the angle between the brace members 41a and 41b, a complex linkage arrangement has been devised. First the two base members 41a and 41b are pivotally connected together near their upper ends by a rod 45 preferably of adjustable length and pivotally connected at each end to the brace members 41a and 41b respectively. The angle between the brace members 41a and 41b can be varied by means of a hydraulic cylinder 46 which is pivotally secured at one end to a vertical post 54 secured to the secondary frame 14 and at its opposite end it is pivotally secured to the brace member 41b. Operation of the hydraulic cylinder 46 causes the brace member 41b to pivot about the longitudinal axis of pin 44b and hence causes the brace member 41a (as well as the tube 38a) to pivot about the longitudinal axis of the pin 44a. FIGS. 2 and 3 show the effect of operating the hydraulic cylinder 46 in this manner.

The first and second sets of finger members 35 and 36 are respectively controlled by means of a hydraulic cylinder 47 which is pivotally secured to a control arm 48. The arm member 38a is rotated about its longitudinal axis by means of a link 49 which extends between the lower end of the control arm 48 and a short bracket 50 secured to the arm member 38a. The control arm 48 is pivotally supported by a double link assembly 51 which is connected at its lower end to the middle one of the fingers 37. The hydraulic cylinder 47 is pivotally supported on a stabilizer arm 52 which is pivotally attached at one end to the brace member 41a and at its opposite end to the link 51. Finally, the second set of finger members 36 is operated by means of a link 53 which is pivotally attached to the control arm 48 at a point intermediate the upper pivot point of the link 51 and the upper end of the control arm 48. It is important to note that the point at which the stabilizer arm 52 is connected to the brace member 41a is at the same height above the level of the angle members 29 and 30 as the points at which the links 49 and 53 are respectively connected with the the arm members 38a and 38b.

Referring now to FIG. 2, the hydraulic cylinder 46 is shown in its open position, with the arm member 38b in a more vertical position than the arm member 38a. In FIG. 3, the hydraulic cylinder 46 is in a more closed position, with the arm member 38a more nearly vertical than the arm member 38b.

Figure 4:
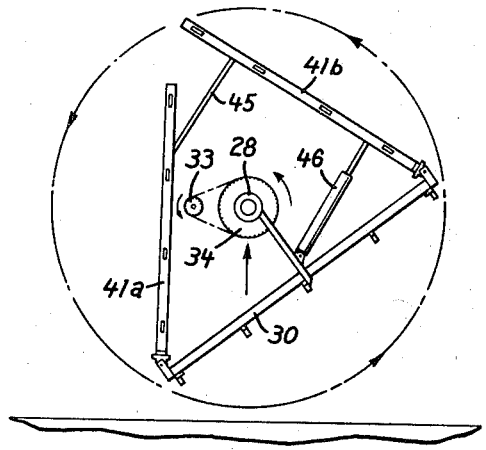
FIG. 4 is a diagrammatic view showing the manner in which the apparatus of FIG. 1 can be rotated to invert a triangular stack grasped by the apparatus.

FIG. 4 diagrammatically illustrates that the clamp assembly 15 can be rotated through 360°. It is often advantageous to invert a stack in order to achieve an efficient storage arrangement as shown in FIG. 5, and this can be done very easily with the present apparatus.

In operation, in order to remove a stack from the ground surface and place it on a trailer for removal to a storage area, for example, the stack is approached from one side and the hydraulic cylinder 46 is operated if necessary to conform the shape of the clamp assembly 15 to the shape of the particular stack. The elevator arms 20 and 21 of the vehicle 22 are lowered so that the third set of fingers 37 graze the ground surface. The vehicle 22 is driven towards the stack, in line with the selected side, and the stack then is received within the triangular enclosure defined by the clamp assembly 15. When the stack is in place, the hydraulic cylinder 47 is actuated so that the first and second sets of finger members 35 and 36 pivot inwardly to securely grasp the adjacent sides of the stack. The operator of the vehicle 22 then raises the elevator arms 20 and 21 and drives the vehicle 22 to the desired location, for example to the side of a trailer used for transporting the stacks from the field. When the clamp assembly 15 (and the stack within it) are positioned over the trailer, the hydraulic cylinder 47 is actuated to cause the finger members 35 and 36 to pivot outwardly to release the stack from their grasp. The vehicle 22 can then be withdrawn, and the stack will slide off the third set of fingers 37 and remain in place on the trailer. In order to ensure positive withdrawal of the stack from the clamp assembly 15 it may be desirable to adjust the hydraulic cylinders 25 and 26 (which control the pitch of the primary frame 13) so that the plane of the third set of fingers 37 is slightly inclined during the withdrawal operation.

What is claimed is:

1. Bale handling apparatus for use with a vehicle having support arm means which are movable from a position near the ground to an elevated positon, said apparatus comprising:

a primary frame secured to said support arm means, a secondary frame supported by said primary frame, said secondary frame being rotatable about a longitudinal aixs of rotation, means for rotating said secondary frame, clamp means secured to said secondary frame for grasping a stack of bales, said clamp means having first, second and third sets of finger members forming a generally triangular enclosure for receiving a triangular stack of bales lying on the ground or in a mow as said apparatus is driven forwardly by said vehicle, the finger members of each set being generally co-planar and said first and second sets of finger members being pivotally movable inwardly to bear against a stack of bales positioned within said clamping means, and means for varying the angle between said first and second movable sets of finger members to conform the shape of said triangular enclosure to the shape of a selected triangular stack of hay bales.

2. Apparatus as claimed in claim 1 wherein said primary frame is pivotally secured to said support arm means and wherein means is provided for adjusting the pitch of said primary frame.

3. Apparatus as claimed in claim 1 wherein said primary frame includes a forwardly extending inner sleeve, and wherein said secondary frame includes a rearwardly extending outer sleeve rotatably supported by said inner sleeve, said outer sleeve being coaxial with said inner sleeve and dimensioned to permit free rotation of said secondary frame about said longitudinal axis of rotation.

4. Apparatus as claimed in claim 1 wherein said first and second sets of movable finger members are respectively secured to two pivotal elongate arm members having upper and lower ends.

5. Apparatus as claimed in claim 4 wherein said arm members are respectively pivotally secured to elongate brace members carried by said secondary frame and having upper and lower ends, said brace members and said arm members being pivotal at their lower ends about axes which are parallel with said axis of rotation, and wherein said angle varying means includes a first link connecting the upper ends of said brace members, a second link having upper and lower ends, a stabilizer arm pivotally connected at one end to one of said brace members and at its opposite end to the upper end of said secondary link, a first hydraulic cylinder, said first hydraulic cylinder being pivotally connected at one end to said stabilizer arm, a control arm having upper and lower ends and pivotally connected at its upper end to the opposite end of said first hydraulic cylinder and being pivotally connected to the second link at a point that is intermediate the ends of said control arm, a third link pivotally connected at one end to one of said arm members and at its other end to the lower end of said control arm, a fourth link that is pivotally attached at one end to said control arm and at its opposite end to the other of said arm members, and a second hydraulic cylinder that is pivotally connected at one end to the upper end of said second link, and at its opposite end to the other of said brace member.

References Cited

UNITED STATES PATENTS

| | | | |
|---|---|---|---|
| 1,551,802 | 9/1925 | Crotts | 294—67 X |
| 2,999,608 | 9/1961 | Ganahl | 214—654 |

GERALD M. FORLENZA, Primary Examiner

G. F. ABRAHAM, Assistant Examiner

U.S. Cl. X.R.

214—6, 652; 294—67